(12) United States Patent
Johnson et al.

(10) Patent No.: US 9,176,582 B1
(45) Date of Patent: Nov. 3, 2015

(54) INPUT SYSTEM

(71) Applicant: Google Inc., Mountain View, CA (US)

(72) Inventors: Michael Patrick Johnson, Sunnyvale, CA (US); Max Benjamin Braun, San Francisco, CA (US)

(73) Assignee: Google Inc., Mountain View, CA (US)

( * ) Notice: Subject to any disclaimer, the term of this patent is extended or adjusted under 35 U.S.C. 154(b) by 202 days.

(21) Appl. No.: 13/860,242

(22) Filed: Apr. 10, 2013

(51) Int. Cl.
*G09G 5/00* (2006.01)
*G06F 3/01* (2006.01)

(52) U.S. Cl.
CPC .................................. *G06F 3/013* (2013.01)

(58) Field of Classification Search
CPC ....... G06F 3/013; G06F 3/011; G02B 27/017; G02B 2027/014; G02B 2027/0187; G02B 2027/0138
USPC ............. 345/7, 8, 156; 359/13, 630; 709/206, 709/207; 382/103
See application file for complete search history.

(56) References Cited

U.S. PATENT DOCUMENTS

| | | | |
|---|---|---|---|
| 6,346,887 B1 | 2/2002 | Van Orden et al. | |
| 7,301,465 B2* | 11/2007 | Tengshe et al. | 340/575 |
| 7,444,383 B2* | 10/2008 | Horvitz | 709/207 |
| 7,553,021 B2* | 6/2009 | Fergason et al. | 351/210 |
| 7,652,583 B2* | 1/2010 | Sanchez et al. | 340/575 |
| 7,762,665 B2* | 7/2010 | Vertegaal et al. | 351/209 |
| 8,096,660 B2* | 1/2012 | Vertegaal et al. | 351/209 |
| 8,156,186 B2 | 4/2012 | Singh | |
| 8,292,433 B2* | 10/2012 | Vertegaal | 351/209 |
| 8,322,856 B2 | 12/2012 | Vertegaal et al. | |
| 8,672,482 B2* | 3/2014 | Vertegaal et al. | 351/209 |
| 2003/0038754 A1* | 2/2003 | Goldstein et al. | 345/7 |
| 2004/0030753 A1* | 2/2004 | Horvitz | 709/206 |
| 2004/0183749 A1* | 9/2004 | Vertegaal | 345/7 |
| 2006/0093998 A1* | 5/2006 | Vertegaal | 434/236 |
| 2006/0214807 A1* | 9/2006 | Tengshe et al. | 340/576 |
| 2008/0030685 A1* | 2/2008 | Fergason et al. | 351/210 |
| 2008/0231461 A1* | 9/2008 | Sanchez et al. | 340/575 |

(Continued)

FOREIGN PATENT DOCUMENTS

| | | |
|---|---|---|
| EP | 1611499 | 1/2006 |
| WO | 2004/084054 | 9/2004 |

OTHER PUBLICATIONS

Grauman et al., "Communication Via Eye Blinks—Detection and Duration Analysis in Real Time," [http://www.cs.bu.edu/faculty/betke/papers/GraumanBetkeGipsBradski-CVPRo1.pdf]; 2001 IEEE, pp. 1-1010 to 1-1017.

(Continued)

*Primary Examiner* — Lun-Yi Lao
*Assistant Examiner* — Peter D McLoone
(74) *Attorney, Agent, or Firm* — McDonnell, Boehnen, Hulbert & Berghoff LLP (57) ABSTRACT

Devices and methods are described for timing notifications based on blinks. An example method may include (1) receiving input data that is indicative of movement of an eye; (2) detecting an occurrence of an event; in response to detection of the event: (3) determining at least one notification corresponding to the event; (4) delaying presentation of the at least one notification until the computing device determines that the input data is indicative of at least one blink by the eye; and in response to the input data that is indicative of the at least one blink, (5) causing the at least one notification to be presented.

18 Claims, 8 Drawing Sheets

(56) References Cited

U.S. PATENT DOCUMENTS

| | | | |
|---|---|---|---|
| 2011/0043617 A1* | 2/2011 | Vertegaal et al. | 348/78 |
| 2012/0019662 A1 | 1/2012 | Maltz | |
| 2012/0021806 A1 | 1/2012 | Maltz | |
| 2012/0032806 A1* | 2/2012 | Lee | 340/573.1 |
| 2012/0050142 A1 | 3/2012 | Border et al. | |
| 2012/0078623 A1* | 3/2012 | Vertegaal et al. | 704/231 |
| 2012/0242570 A1 | 9/2012 | Kobayashi | |
| 2012/0249797 A1 | 10/2012 | Haddick et al. | |
| 2012/0268367 A1* | 10/2012 | Vertegaal et al. | 345/156 |
| 2013/0021373 A1 | 1/2013 | Vaught et al. | |
| 2013/0050065 A1 | 2/2013 | Shimizu | |
| 2013/0054576 A1 | 2/2013 | Karmarkar et al. | |
| 2013/0188032 A1* | 7/2013 | Vertegaal | 348/78 |
| 2013/0231938 A1* | 9/2013 | Vertegaal et al. | 704/275 |
| 2013/0257709 A1* | 10/2013 | Raffle et al. | 345/156 |
| 2014/0101608 A1* | 4/2014 | Ryskamp et al. | 715/810 |

OTHER PUBLICATIONS

Chern-Sheng Lin et al., "A New Image Processing Method for Evaluating the Pupillary Responses in a HMD-Type Eye-Tracking Device," [http://140.134.32.129/bioassist/paper/34eyemeasure.pdf], 2003 Elsevier Science Ltd., pp. 505-515.

Vassiliou et al., "Integrated Multimodal Human-Computer Interface and Augmented Reality for Interactive Display Applications," [DialogWeb], Proceedings of the SPIE—The International Society for Optical Engineering, vol. 4022, pp. 106-115.

Hinchliffe, Mark, "All those in Favour, Say Eye," [DialogWeb], Daily Telegraph (Sydney, Australia), Friday, Nov. 23, 2007, p. 19.

Nakano et al., "Blink-Related Momentary Activation of the Default Mode Network While Viewing Videos," [http://www.pnas.org/content/early/2012/12/19/1214804110], PNAS 2012, published online before print Dec. 24, 2012, doi:10.1073/pnas.124804110.

* cited by examiner

FIG. 3

INPUT SYSTEM

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

Many current and developing computing devices provide notifications to users when certain events occur. For example, some wearable computing devices may provide audio or video notifications to a user when a new text message is received, when an incoming phone call is received, when a new email has arrived, and/or when a battery needs to be changed or is low, among others. These notifications, however, may interrupt and/or distract a user whose attention is focused on a particular task.

SUMMARY

The systems and methods described herein generally relate to adjusting the timing of notifications based on blinks. More specifically, research suggests that the act of blinking is neurologically related to a person's attention system resetting. Advantageously, example embodiments recognize that when a person's attention is resetting, they are less likely to be focused on a given task. Thus, timing visual and/or audible notifications to coincide with blinks may help to reduce the probability that the notifications will interrupt or distract a user whose attention is focused on a particular task. For example, when an illustrative head-mountable device (HMD) needs to display a notification to its wearer, the HMD may delay presentation of the notification until the HMD next detects a blink. Other examples are also possible.

In one example embodiment, a system is provided. The system may include: (1) a non-transitory computer-readable medium; and (2) program instructions stored on the non-transitory computer-readable medium and executable by at least one processor to cause a computing device to: (a) receive input data that is indicative of movement of an eye; (b) detect an occurrence of an event; and in response to detection of the event: (i) determine at least one notification corresponding to the event; (ii) delay presentation of the at least one notification until the computing device determines that the input data is indicative of at least one blink by the eye; and in response to the input data that is indicative of the at least one blink, (iii) cause the at least one notification to be presented.

In another aspect, a computer-implemented method is provided. The method may involve: (1) receiving input data that is indicative of movement of an eye; (2) detecting an occurrence of an event; and in response to detection of the event: (a) determining at least one notification corresponding to the event; (b) delaying presentation of the at least one notification until the computing device determines that the input data is indicative of at least one blink by the eye; and in response to the input data that is indicative of the at least one blink, (c) causing the at least one notification to be presented.

In another aspect, a non-transitory computer-readable medium is provided. The non-transitory computer-readable medium may include (1) instructions for receiving input data that is indicative of movement of an eye; (2) instructions for detecting an occurrence of an event; and in response to detection of the event: (a) instructions for determining at least one notification corresponding to the event; (b) instructions for delaying presentation of the at least one notification until a computing device determines that the input data is indicative of at least one blink by the eye; and (c) in response to the input data that is indicative of the at least one blink, instructions for presenting the at least one notification.

These as well as other aspects, advantages, and alternatives, will become apparent to those of ordinary skill in the art by reading the following detailed description, with reference where appropriate to the accompanying drawings. Further, it should be understood that this summary and other descriptions and figures provided herein are intended to be illustrative embodiments by way of example only and that numerous variations are possible. For instance, structural elements and process steps can be rearranged, combined, distributed, eliminated, or otherwise changed, while remaining within the scope of the embodiments as claimed.

DETAILED DESCRIPTION

Example systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

According to an example embodiment, a computing device may detect the occurrence of an event that might normally lead to immediate presentation of a notification to a user. The event may be, for example, the receipt of an email or text message, an incoming phone call, a calendar reminder, or any number of similar events. The notification may take various forms as well. A visual notification may be displayed on a display screen, an audible notification may be presented from one or more speakers, or a tactile notification such as a vibration may occur. The type of notification may be based on default settings or user input. For example, a user may dictate that email notifications be presented visually, while phone calls and battery state notifications be presented audibly. Other examples are also possible.

In some cases, however, the immediate presentation of a given notification may have the potential to interrupt whatever the user is currently doing, and may be distracting to the user. Therefore, in response to the computing device detecting an event, the device may delay presentation of the corresponding notification until there is a lower probability of interrupting and/or distracting the user.

Simultaneously, a camera or similar eye-tracking sensor(s) may monitor the eye movement of the user and relay eye movement information to the computing device. The computing device may continue to delay presentation of the given notification until it determines that the user has blinked, at which point it may cause the notification to be presented. In this way, the computing device may use the occurrence of a blink as an indication that the user's attention may be resetting, and thus it is a more appropriate time to present the notification with less distraction to the user.

II. EXAMPLE WEARABLE COMPUTING DEVICES

Systems and devices in which example embodiments may be implemented will now be described in greater detail. In general, an example system may be implemented in or may take the form of a wearable computer (also referred to as a wearable computing device). In an example embodiment, the wearable computer takes the form of or includes a head-mountable device (HMD).

An example system may also be implemented in or take the form of other devices, such as a desktop, laptop, or tablet computer, or mobile phone, among other possibilities. Further, an example system may take the form of non-transitory computer-readable medium, which has program instructions stored thereon that are executable by at a processor to provide the functionality described herein. An example system may also take the form of a device such as a wearable computer or mobile phone, or a subsystem of such a device, which includes such a non-transitory computer-readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

Figure 1A:
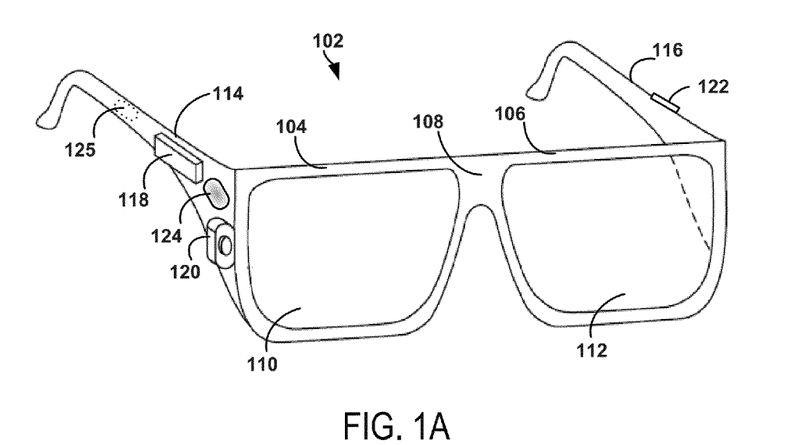
FIG. 1A illustrates a wearable computing system according to an example embodiment.

FIG. 1A illustrates a wearable computing system according to an example embodiment. In FIG. 1A, the wearable computing system takes the form of an HMD 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touchpad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touchpad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture devices may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touchpad 124 is shown on the extending side-arm 114 of the HMD 102. However, the finger-operable touchpad 124 may be positioned on other parts of the HMD 102. Also, more than one finger-operable touchpad may be present on the HMD 102. The finger-operable touchpad 124 may be used by a user to input commands. The finger-operable touchpad 124 may sense at least one of a pressure, position and/or a movement of one or more fingers via capacitive sensing, resistance sensing, or a surface acoustic wave process, among other possibilities. The finger-operable touchpad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touchpad surface. In some embodiments, the finger-operable touchpad 124 may be formed of one or more translucent or transparent insulating layers and one or more translucent or transparent conducting layers. Edges of the finger-operable touchpad 124 may be formed to have a raised, indented, or roughened surface, so as to provide tactile feedback to a user when the user's finger reaches the edge, or other area, of the finger-operable touchpad 124. If more than one finger-operable touchpad is present, each finger-operable touchpad may be operated independently, and may provide a different function.

In some embodiments, hand or finger based inputs that can be received via touchpad 124 can be received using one or more hand-movement input devices configured to detect hand movements and/or finger movements and provide corresponding hand-movement data, such as but not limited to, buttons, touch screens, computer mice, gesture sensors, free space/3D gesture sensors, virtual reality gloves, other types of gloves, cameras, optical gesture sensors, non-contact electrostatic gesture sensors, a magnetometer detecting a moving magnetic field controlled by a wearer; e.g., a ring having a magnetic field being worn and moved by the wearer, and infrared sensors/sensor arrays.

In a further aspect, HMD 102 may be configured to receive user input in various ways, in addition or in the alternative to user input received via finger-operable touchpad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. Eye movements may broadly include movements of the eyelid and other muscles surrounding the eye in addition to movement of the actual eyeball. In particular, HMD 102 may include one or more inward-facing image capture devices and/or one or more other inward-facing sensors (not shown) that may be used to track eye movements and/or determine the direction of a wearer's gaze. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. It should also be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
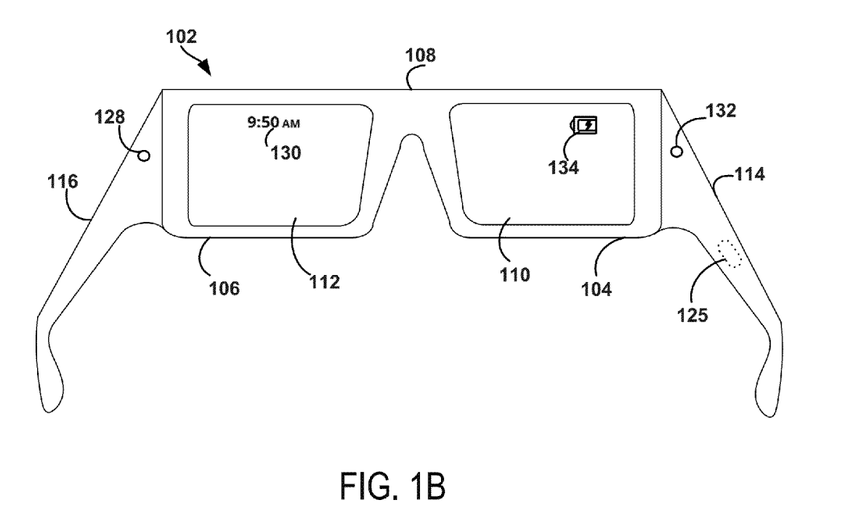
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
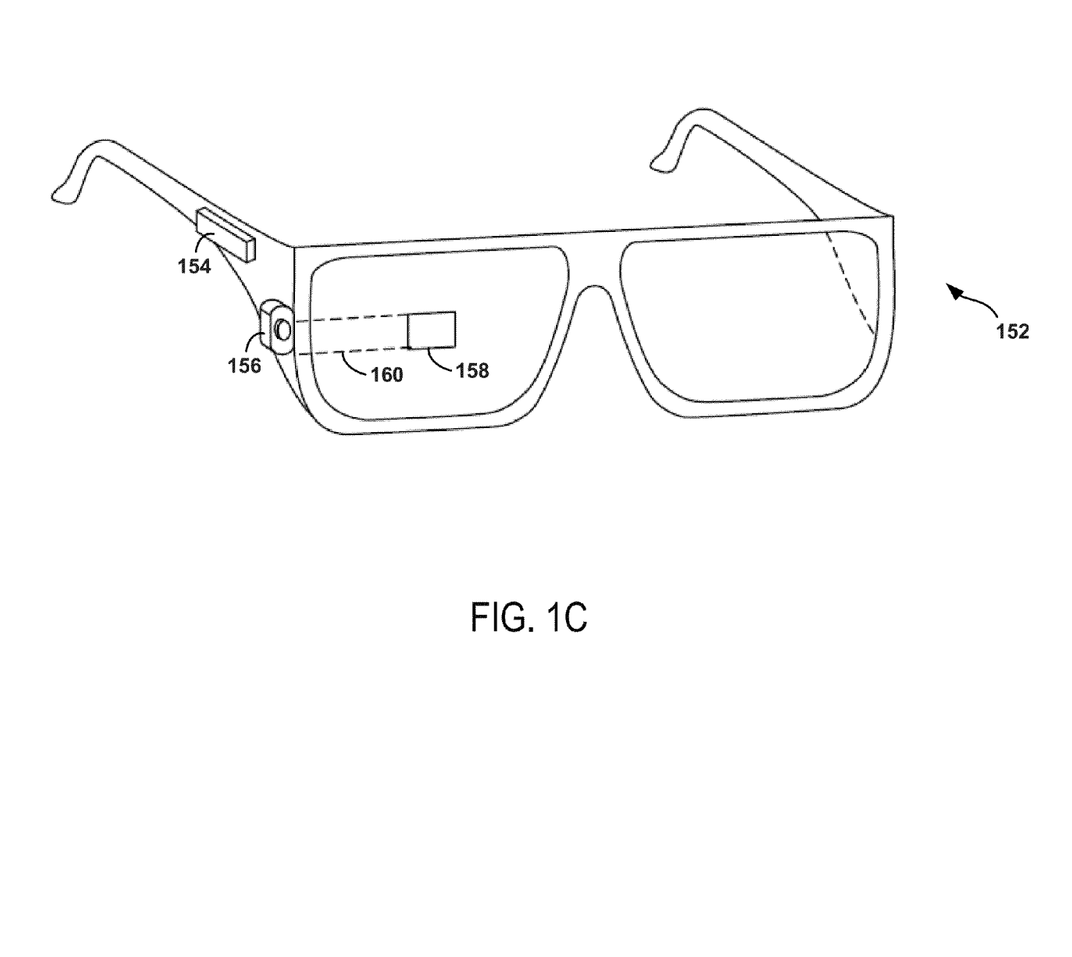
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 may be controllable via the computing system 154 that is coupled to the display 158 via an optical waveguide 160.

Figure 1D:
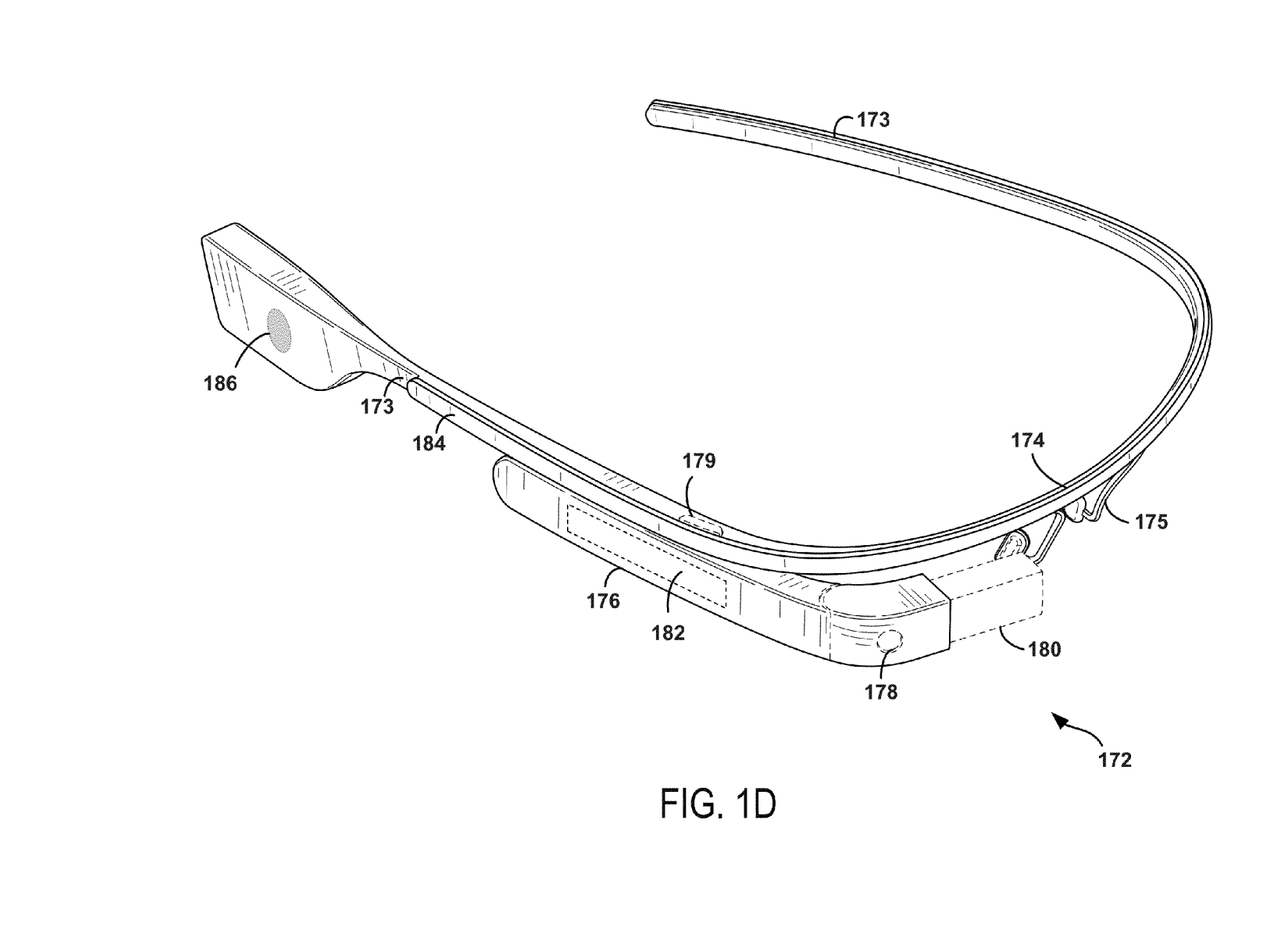
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
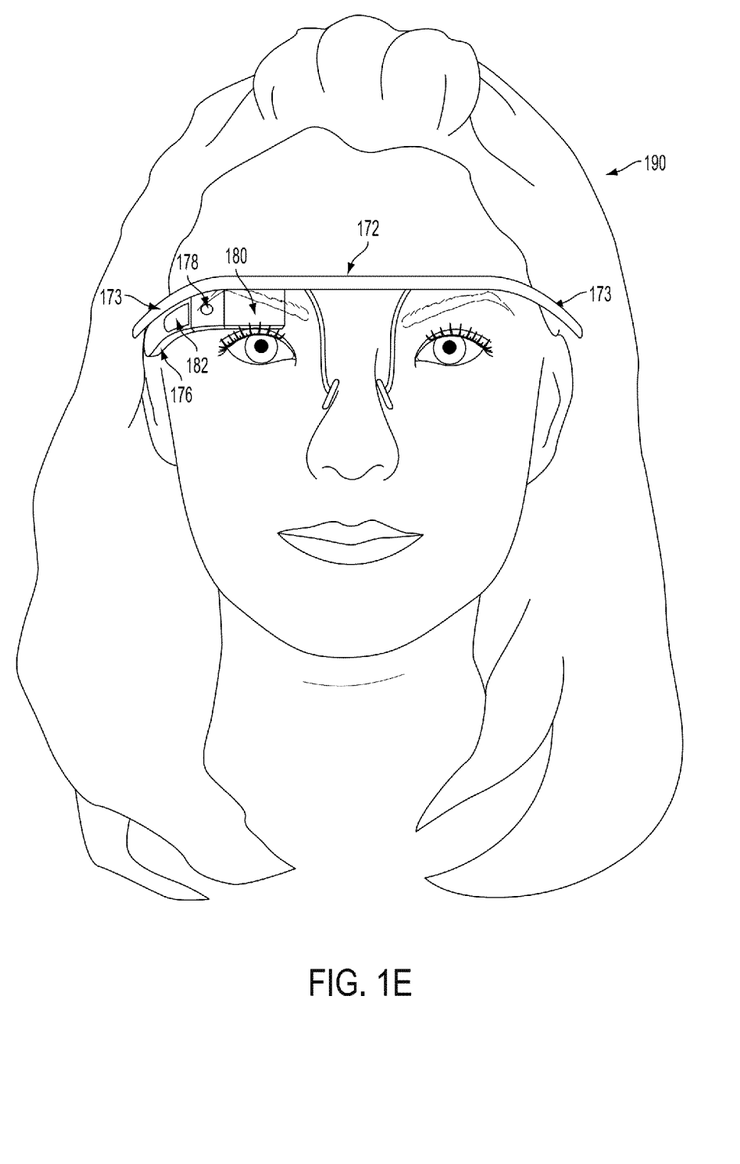
FIGS. 1E to 1G are simplified illustrations of the wearable computing system shown in FIG. 1D, being worn by a wearer.
Figure 1F:
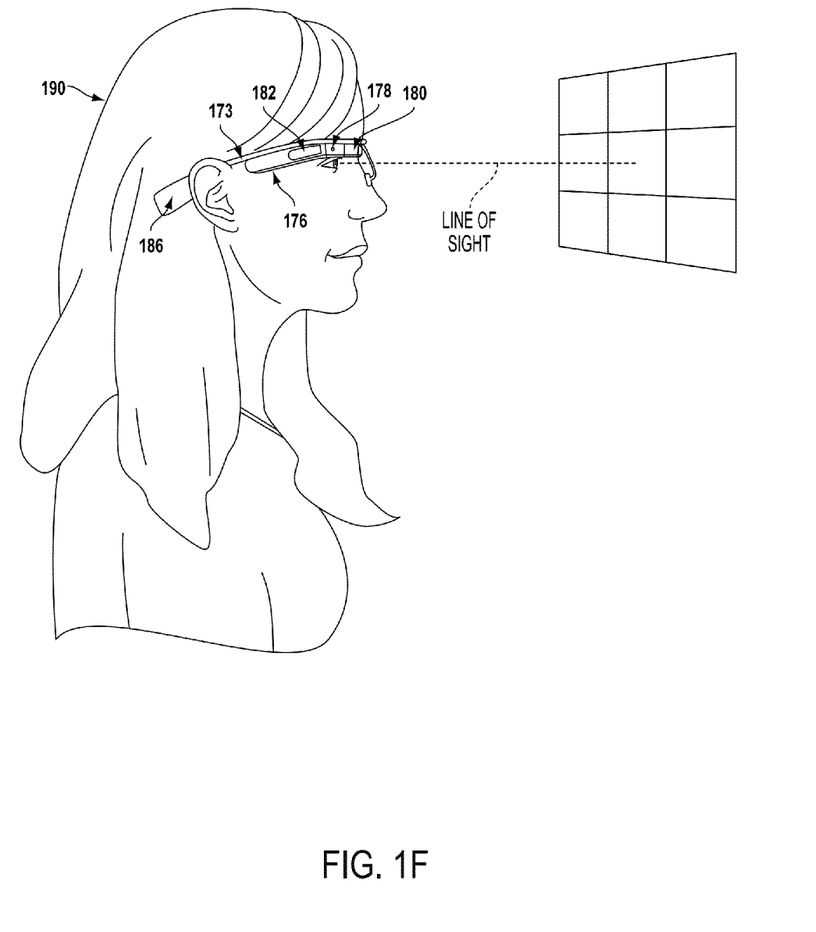
Figure 1G:
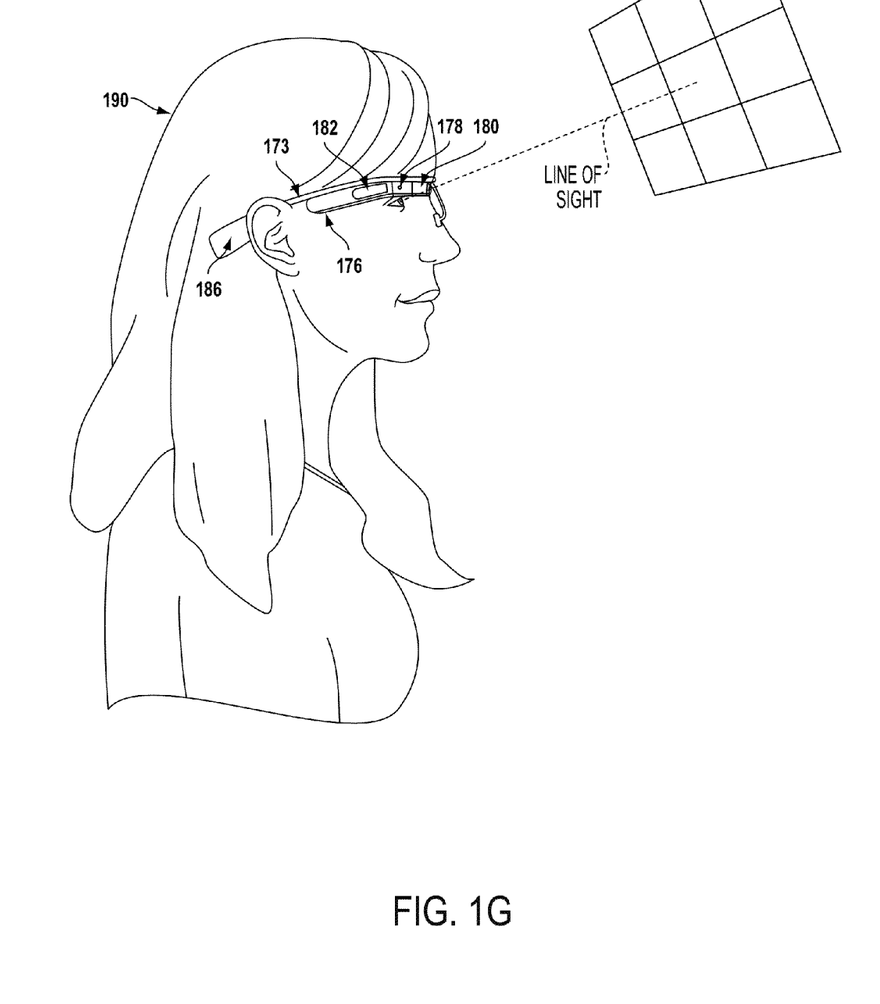

FIGS. 1E to 1G are simplified illustrations of the HMD 172 shown in FIG. 1D, being worn by a wearer 190. As shown in FIG. 1F, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn by a user, display 180 is positioned in front of or proximate to a user's eye. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with her peripheral vision. As a result, display 180 may be outside the central portion of the wearer's field of view when her eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with her eyes only (possibly without moving her head). This is illustrated as shown in FIG. 1G, where the wearer has moved her eyes to look up and align her line of sight with display 180. A wearer might also use the display by tilting her head down and aligning her eye with the display 180.

Figure 2:
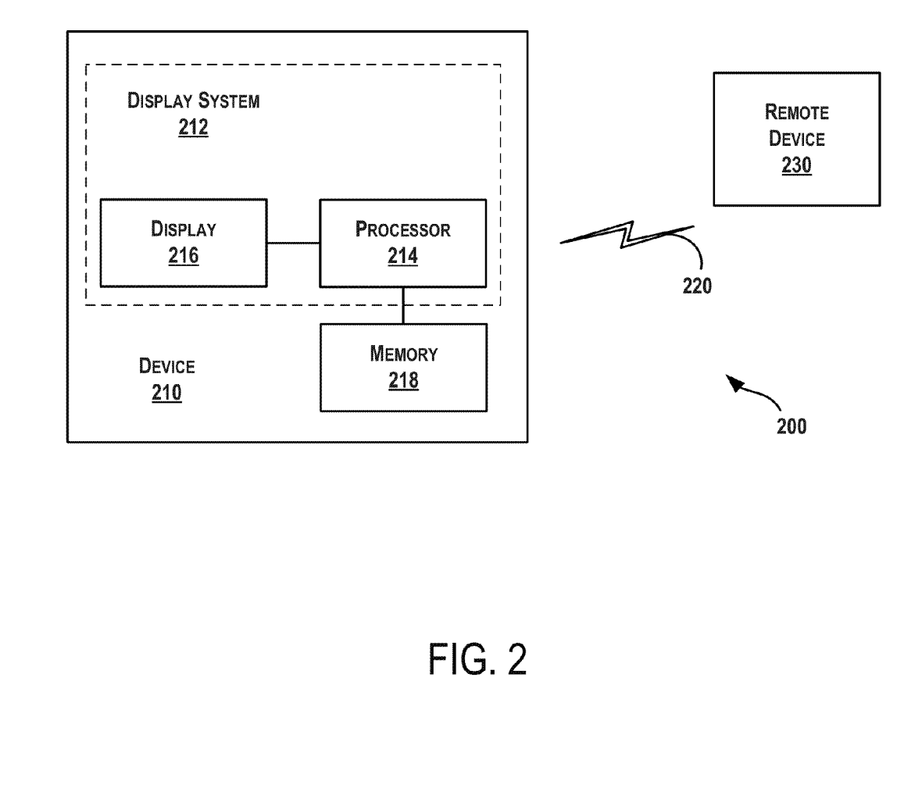
FIG. 2 illustrates a schematic drawing of a computing device according to an example embodiment.

FIG. 2 illustrates a schematic drawing of a system 200 according to an example embodiment, including computing device 210. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.)

III. EXAMPLES OF TIMING NOTIFICATIONS BASED ON BLINKS

Figure 3:
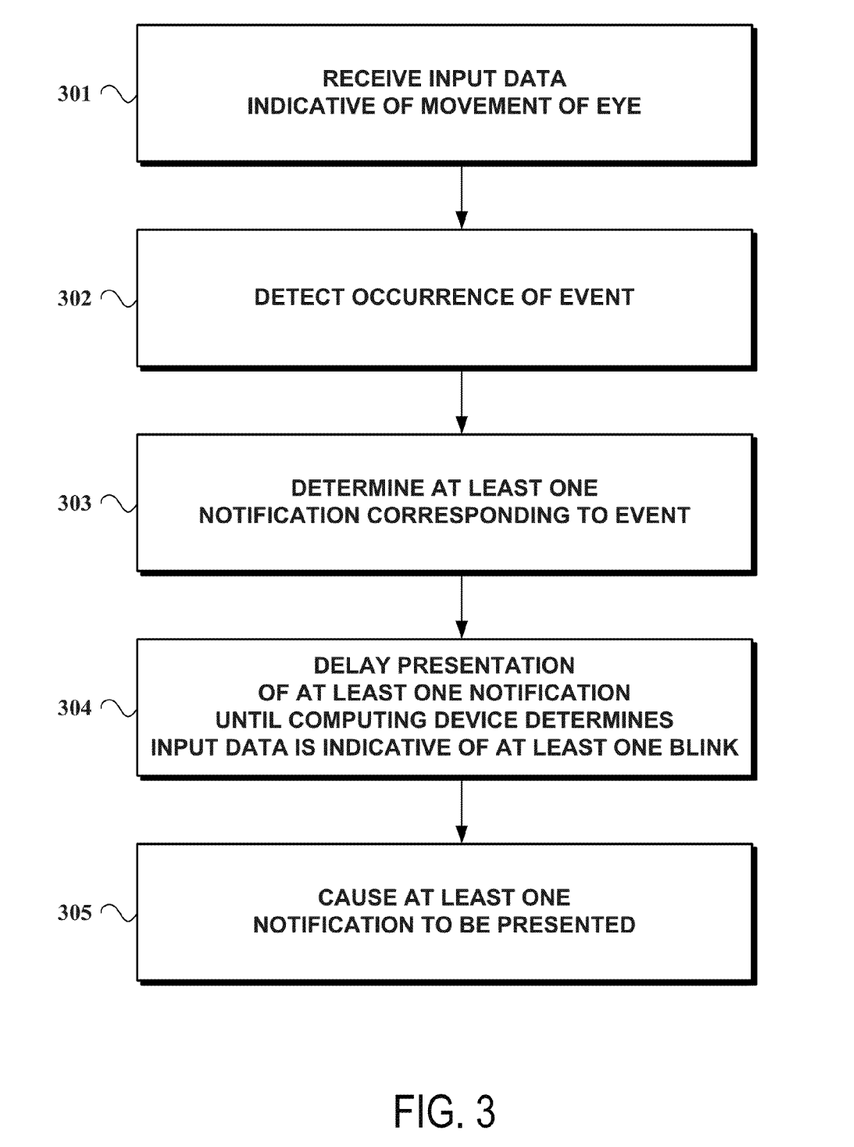
FIG. 3 illustrates a flowchart depicting an example method.

FIG. 3 shows a flowchart depicting an example method implemented by an example computing device 210. The example method will be described below as being implemented by the HMD 172 as shown in FIGS. 1D-G. However, the computing device 210 may take other forms as well, including both wearable and non-wearable devices.

In an example embodiment, the HMD 172 may detect 302 the occurrence of an event that may be presented to the user 190 as a notification. The event may be, for example, the receipt of a new email. In response to detecting 302 the occurrence of the event, the HMD 172 may determine 303 at least one notification corresponding to the event. For instance, the HMD 172 may determine 303, either based on default settings or user input, a visual notification corresponding to the received email that may be presented on the display 180. Other examples are also possible. For example, the user 190 may configure the HMD 172 to determine both a visual and an audible notification for a received email.

Further, in response to detecting 302 the occurrence of the event, the HMD 172 may also delay 304 presentation of the notification. Concurrently, the HMD 172 may receive 301 input data from an inward facing camera or similar eye-tracking sensor (not shown) that is indicative of movement of the user's eyes. The HMD 172 may delay 304 presentation of the given notification until it determines that the eye movement data indicates a blink of the user's eyes. In response to the blink, the HMD 172 may cause 305 the notification to be presented to the user 190. If the HMD 172 has determined 303 more than one notification for a given event, they may be presented at the same time. Alternatively, the HMD 172 may delay one of the notifications corresponding to a given event and present the other, and it may do so based on the context of the device. For example, the HMD 172 may be configured to present both audio and video notification upon receipt of a text message. If the HMD 172 is in a state where it is playing a voice message or some other audio-based task, it may present the video notification but delay the audio notification. Other examples are also possible.

In some cases, multiple events may occur in the intervening time between a user's blinks. Therefore, in some example embodiments the HMD 172 may be further configured to maintain a queue of notifications that have not yet been presented. In some embodiments, the HMD 172 may present notifications from the queue in the order they were received or alternatively, in the reverse order that they were received. The HMD 172 might also present the queued notifications in a random order.

Further, in some embodiments, the HMD 172 may present queued notifications in a preferred order of importance. For instance, the HMD 172 may assign a priority value to the notifications in the queue, and then cause the notification in the queue with the highest priority value to be presented in response to each blink. The priority value assigned to each notification in the queue may be based on default values or user input. For example, a default priority value may be based on the order in which the corresponding events occurred, resulting in a first-in, first-out presentation of the notifications. Alternatively, certain events may be designated by default or by the user 190 as being more important than others, and thus the corresponding notifications may be assigned a higher priority value. For example, a notification that a new email has been received may be "waiting" in queue for a user's blink to be presented. However, a more important event such as an incoming text message may occur, and the HMD 172 may assign the corresponding notification a higher priority value. Consequently, at the user's next blink, she may be presented with the notification of the text message. The notification of the email may remain in queue until the following blink, unless it is superseded by another higher priority notification. Other techniques for assigning priority to queued notifications are also possible.

In a further aspect, the HMD 172 may handle notifications differently based on the respective lengths of time for which notifications have been delayed. For instance, the HMD 172 may assign a threshold queue time to a given notification, after which the notification may be presented, even if no blink has been detected. More specifically, the HMD 172 may receive an indication that a given time period has elapsed, wherein the given time period is greater than the threshold queue time. In response to the indication that the given time period has elapsed, the HMD 172 may cause the notification to be presented.

As a specific example, the HMD 172 may be configured to delay the presentation of an incoming phone call notification, but also to assign a threshold queue time of, for instance, five seconds, for presentation of the phone-call notification. Thus, if an incoming phone call is received, the notification will be initially delayed. However, if the HMD 172 does not detect a blink within five seconds, the phone call notification will be presented.

Further, when a notification reaches a threshold queue time, the HMD 172 may responsively take other actions, in addition or in the alternative to presenting the notification. As an example, the HMD 172 may update the given notification in response to the indication that the given time period has elapsed. For instance, the form of the notification may be updated from visual to audible. The HMD 172 may also adjust attributes of the notification, such as the color and/or brightness of a visual notification, or the volume and/or duration of an audible notification. Other examples are also possible.

IV. EXAMPLES OF TIMING NOTIFICATIONS BASED ON A BLINK RATE

In another example embodiment, the HMD 172 may estimate the attention state of the user 190 based on more information than a single, instantaneous blink. Rather, the HMD 172 may estimate the attention state of the user 190 based on the number of blinks that have occurred over a given time period. The estimation of the user's attention state may be ongoing, and may be adjusted as time progresses and more blink data is received. In this way, the HMD 172 may base the presentation of notifications on how many blinks have occurred over a given period of time. Moreover, many of the other features described above, including notification queuing and prioritization, are also applicable here.

For example, the HMD 172 may receive an indication that a given time period has elapsed. The HMD 172 may also receive input data indicating the number of blinks that occurred within the given time period, and may delay presentation of the notification until it determines that the number of blinks that occurred within the given time period is above a threshold number. In response to the number of blinks in the given time period being above the threshold, the HMD 172 may cause the notification to be presented.

For instance, if the user 190 only blinked three times in a given sixty second period, it may imply that her attention has been highly focused on something. In response, the HMD 172 might only present notifications above a certain priority value in response to the next blink. Or, the HMD 172 may not display any notifications at all until the user 190 has blinked more than a threshold number of times in a given time period, indicating a state of lower attention. For example, the HMD 172 may hold all but the highest priority notifications until the user 190 has blinked at least ten times in a sixty second period. Such thresholds may be configured by default, by direct user input, or the HMD 172 may adapt these thresholds based on the monitored tendencies of the user 190, as described in the following paragraphs.

The HMD 172 may initially use blink rate thresholds based on average values obtained through testing or other estimates. However, different users may naturally blink at different rates than others, and each individual's rate of blinking may correspond differently to his or her attention state. Thus, the same number of blinks for two different users within a given time period may not reflect similar attention states for the two users. For this reason, the HMD 172 in some example embodiments may be configurable to monitor a particular user's blink rate over time as she performs certain activities in order to form a more accurate estimation of her attention state.

For instance, the HMD 172 may have access to cues regarding some user activities that are suggestive of a focused attention state, such as clicking, scrolling, reading a message, and composing a message, among others. The HMD 172 may receive input data that is indicative of at least one such activity such as touchpad input data, eye movement input data indicative of reading, and/or speech-to-text input data. Other activities with similarly associated input data cues are also possible. The HMD 172 may correlate the user activity input data with a recent period of eye movement input data that includes indications of at least one blink. Based on the correlation, the HMD 172 may determine an estimated attentive blink rate for the user. The estimated attentive blink rate may comprise a given period of time and a threshold number of blinks, which may then be used as a basis for presenting notifications for the particular user 190.

As an example, the HMD 172 may receive eye movement input data that indicates the user 190 is reading a message, either on the display 180 or elsewhere. While the user 190 is reading the message, the HMD 172 may also receive input data regarding the number of times the user blinks. This process may be repeated any number of times, for varying time periods and for various activities that may be suggestive of a focused user state. The correlation of the activity and blink data may indicate that the user 190 typically blinks no more than four times every sixty seconds whenever she is engaged in one of the monitored activities. This may represent the estimated attentive blink rate for the user 190. The estimated attentive blink rate can be used to identify periods of user focus that may not have other cues that are identifiable by the HMD 172. In other words, it can be assumed that if the user has blinked four times (the threshold number of blinks) or less in a given sixty second period (the given time period), there is a higher probability that her attention is focused on something. Thus, HMD 172 may adapt the presentation of notifications accordingly.

In addition to the HMD 172 adapting its thresholds based on the identity of the user, it may also adapt its thresholds based on the context of the HMD 172. For example, a similar approach may be taken for a single user 190 at different times during the course of a day, as her attention states and estimated attentive blink rates may be different in the morning versus later in the day when she is tired. Accordingly, the HMD 172 may monitor the user's blink rate and correlate this data with the time of day as well as cues regarding the user's activity, as described above. This information may allow the HMD 172 to better estimate a user's attention state at different times of the day, and it may adjust its blink and time period thresholds for the presentation of notifications as the day progresses. Other contexts for the HMD 172 are also possible.

V. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrently or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium such as a storage device including a disk or hard drive or other storage medium.

The computer-readable medium may also include non-transitory computer-readable media such as computer-readable media that stores data for short periods of time like register memory, processor cache, and random access memory (RAM). The computer-readable media may also include non-transitory computer-readable media that stores program code and/or data for longer periods of time, such as secondary or persistent long term storage, like read only memory (ROM), optical or magnetic disks, compact-disc read only memory (CD-ROM), for example. The computer-readable media may also be any other volatile or non-volatile storage systems. A computer-readable medium may be considered a computer-readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system comprising:
   a non-transitory computer-readable medium; and
   program instructions stored on the non-transitory computer-readable medium and executable by at least one processor to cause a computing device to:
      receive input data that is indicative of at least one user activity;
      receive an indication that a length of time has elapsed;
      receive input data indicating a number of blinks that occurred in the given length of time;
      determine an estimated attentive blink rate, wherein the estimated attentive blink rate is based on the at least one user activity and comprises:
         the given length of time; and
         the number of blinks that occurred in the given length of time;
      detect an occurrence of an event; and
      in response to detection of the event:
         determine at least one notification corresponding to the event;
         delay presentation of the at least one notification until the computing device determines that the number of blinks that occurred in the given length of time is above the estimated attentive blink rate; and
         in response to the determination that the number of blinks that occurred in the given length of time is above the estimated attentive blink rate, cause the at least one notification to be presented.

2. The system of claim 1, wherein the at least one notification comprises at least one of a visual notification, an audible notification, and a tactile notification.

3. The system of claim 1, wherein the system further comprises a head-mountable device, wherein the head-mountable device comprises at least one display element, and wherein the at least one notification is displayed on the display element.

4. The system of claim 1, further comprising program instructions stored on the non-transitory computer-readable medium and executable by at least one processor to cause the computing device to:
   maintain a queue of notifications that have not been presented;
   assign a priority value to each notification in the queue; and
   in response to the determination that the number of blinks that occurred in the given length of time is above the estimated attentive blink rate, cause the notification in the queue with the highest priority value to be presented.

5. The system of claim 1, further comprising program instructions stored on the non-transitory computer-readable medium and executable by at least one processor to cause the computing device to:
   assign a threshold queue time to a given notification;
   receive an indication that a given time period has elapsed, wherein the given time period is greater than the threshold queue time assigned to the given notification; and
   in response to the indication that the given time period has elapsed, cause the given notification to be presented.

6. The system of claim 5, further comprising program instructions stored on the non-transitory computer-readable medium and executable by at least one processor to cause the computing device to:
   in response to the indication that the given time period has elapsed, update the given notification.

7. A computer-implemented method comprising:
   receiving input data that is indicative of at least one user activity;
   receiving an indication that a given length of time has elapsed;
   receiving input data indicating a number of blinks that occurred in the given length of time;
   determining an estimated attentive blink rate, wherein the estimated attentive blink rate is based on the at least one user activity and comprises:
      the given length of time; and
      the number of blinks that occurred in the given length of time;
   detecting an occurrence of an event; and
   in response to detection of the event:
      determining at least one notification corresponding to the event;
      delaying presentation of the at least one notification until the computing device determines that the number of blinks that occurred in the given length of time is above the estimated attentive blink rate; and
      in response to the determination that the number of blinks that occurred in the given length of time is above the estimated attentive blink rate, causing the at least one notification to be presented.

8. The computer-implemented method of claim 7, wherein the at least one notification comprises at least one of a visual notification, an audible notification, and a tactile notification.

9. The computer-implemented method of claim 7, wherein the method is implemented by a head-mountable device comprising at least one display element, and wherein the step of causing the at least one notification to be presented comprises causing the at least one notification to be displayed on the display element.

10. The computer-implemented method of claim 7, further comprising the steps of:
maintaining a queue of notifications that have not been presented; and
assigning a priority value to each notification in the queue, wherein the step of causing the at least one notification to be presented comprises causing the notification in the queue with the highest priority value to be presented.

11. The computer-implemented method of claim 7, further comprising the steps of:
assigning a threshold queue time to a given notification;
receiving an indication that a given time period has elapsed, wherein the given time period is greater than the threshold queue time assigned to the given notification; and
in response to the indication that the given time period has elapsed, causing the given notification to be presented.

12. The computer-implemented method of claim 11, further comprising the steps of:
in response to the indication that the given time period has elapsed, updating the given notification.

13. A non-transitory computer-readable medium having instructions stored thereon, the instructions comprising:
instructions for receiving input data that is indicative of at least one user activity;
instructions for receiving an indication that a given length of time has elapsed;
instructions for receiving input data indicating a number of blinks that occurred in the given length of time;
instructions for determining an estimated attentive blink rate, wherein the estimated attentive blink rate is based on the at least one user activity and comprises:
the given length of time; and
the number of blinks that occurred in the given length of time;
instructions for detecting an occurrence of an event; and
in response to detection of the event:
instructions for determining at least one notification corresponding to the event;
instructions for delaying presentation of the at least one notification until a computing device determines that number of blinks that occurred in the given length of time is above the estimated attentive blink rate; and
in response to the determination that the number of blinks that occurred in the given length of time is above the estimated attentive blink rate, instructions for presenting the at least one notification.

14. The non-transitory computer-readable medium of claim 13, further comprising instructions for presenting the at least one notification as at least one of a visual notification, an audible notification, and a tactile notification.

15. The non-transitory computer-readable medium of claim 13, further comprising instructions for displaying the at least one notification on a display element of a head-mountable device.

16. The non-transitory computer-readable medium of claim 13, further comprising:
instructions for maintaining a queue of notifications that have not been presented;
instructions for assigning a priority value to each notification in the queue; and
in response to the determination that the number of blinks that occurred in the given length of time is above the estimated attentive blink rate, instructions for causing the notification in the queue with the highest priority value to be presented.

17. The non-transitory computer-readable medium of claim 13, further comprising:
instructions for assigning a threshold queue time to a given notification;
instructions for receiving an indication that a given time period has elapsed, wherein the given time period is greater than the threshold queue time assigned to the given notification; and
in response to the indication that the given time period has elapsed, instructions for causing the given notification to be presented.

18. The non-transitory computer-readable medium of claim 17, further comprising:
in response to the indication that the given time period has elapsed, instructions for updating the given notification.

* * * * *